July 7, 1953

J. A. CROSS 2,644,758

PASTEURIZING METHODS AND APPARATUS

Filed Oct. 5, 1950

Inventor.
Joseph A. Cross.
By Victor M. Langsett
Attorney.

July 7, 1953 J. A. CROSS 2,644,758
PASTEURIZING METHODS AND APPARATUS
Filed Oct. 5, 1950 3 Sheets-Sheet 2

Inventor,
Joseph A. Cross,
By: Victor M. Langell
Attorney.

July 7, 1953        J. A. CROSS        2,644,758
PASTEURIZING METHODS AND APPARATUS
Filed Oct. 5, 1950        3 Sheets-Sheet 3
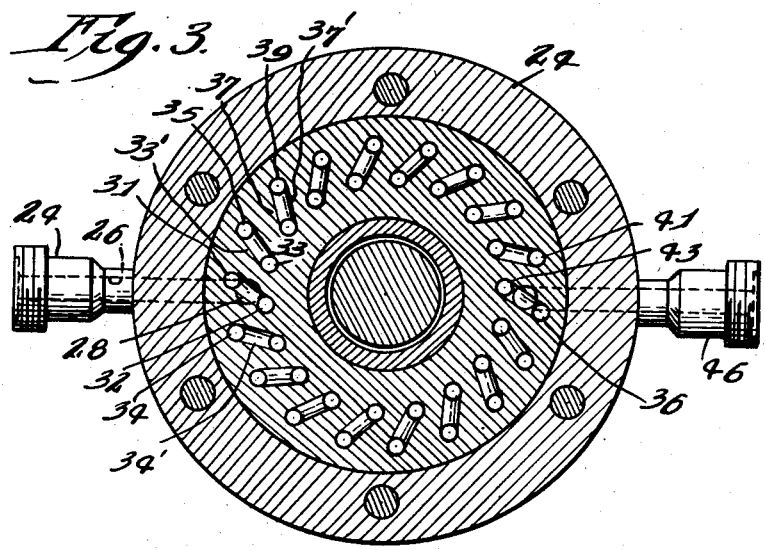
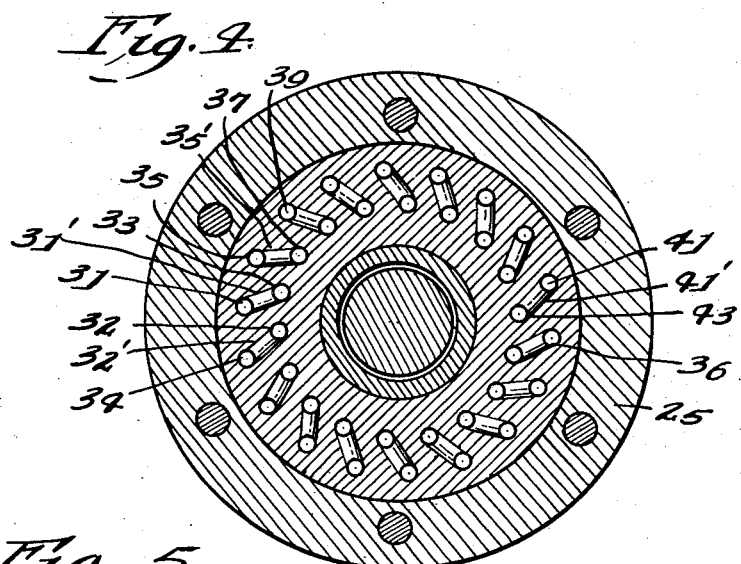
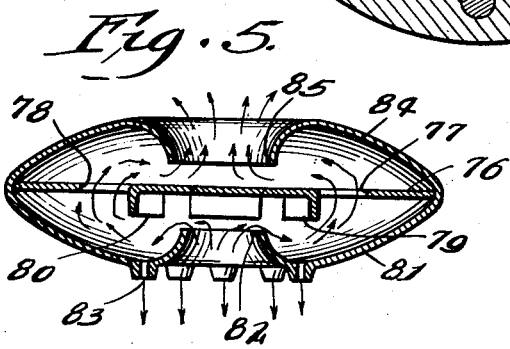
Inventor.
Joseph A. Cross
By. Victor M. Langsett
Attorney.

Patented July 7, 1953

2,644,758

UNITED STATES PATENT OFFICE 2,644,758

PASTEURIZING METHODS AND APPARATUS

Joseph A. Cross, Westerville, Ohio, assignor to Mojonnier Bros. Co. Inc., Chicago, Ill., a corporation of Illinois Application October 5, 1950, Serial No. 188,586

7 Claims. (Cl. 99—212)

This invention relates to improvements in methods and apparatus for pasteurizing milk and milk products.

Among the products for which this invention is especially well suited are whole milk, skim milk, cream, ice cream mix, mixtures containing any of the above, and partially condensed products of any of the above. Pasteurizing methods commonly in use, such as the heating of any of the above food products to about 160° F. for 15 seconds or to 145° F. for 30 minutes fail to destroy bacteria completely. They merely reduce the bacteria count to a percentage or "count" approved by local boards of health, but in many cases the bacteria count rises after such pasteurizing treatment.

While it has been known for some time that temporary heating of the foregoing liquid comestibles to such higher temperatures as 190° F. to 300° F. will destroy or render harmless more of the harmful bacteria, in fact to the point of almost complete sterility, it has not been found practical to do so because of the very marked "cooked" flavor which has always resulted heretofore from such processing.

The present invention provides new methods and apparatus for pasteurizing which will completely destroy bacteria, that is, as high as 99.99% of the bacteria, yet not yield a product having a "cooked" flavor. Any and all of the liquid comestibles above mentioned, which will be understood to be comprehended within the arbitrarily selected term "milk products," as hereinafter used, may be effectively sterilized to the extent of having 99.99% of their bacteria destroyed by heating to a temperature above 190° F. for a period of several seconds or more. But, to accomplish this pasteurizing at such unusually high temperatures without imparting to the final product a "cooked" flavor is a problem not heretofore satisfactorily solved to the best of my knowledge.

My invention aims in general to provide a new pasteurizing method and apparatus for substantially completely destroying bacteria in "milk products" at temperatures above 190° F. and yielding products lacking that "cooked" flavor normally to be expected and usually resulting from such high heating.

Another object of the invention is to provide a pasteurizing process and apparatus which will have the foregoing advantage and additionally rid the "milk products" of other odors or flavors, among which are certain flavors resulting from the eating by the cows of leeks and certain clovers, which vegetation often imparts pungent and unpleasant odors to the milk products.

Another object of the invention is to make possible the accomplishment of the foregoing objectives with time saving and space saving apparatus.

Other particular objects and advantages of the invention will be mentioned hereinafter or will become apparent upon a perusal of the following specification in which a preferred form of the invention is described for illustrative purposes.

In the drawings:

Figure 1 is a diagrammatic layout of a preferred form of the apparatus embodying my invention.

Figure 3 is a sectional view taken on line III—III of Fig. 2.

Figure 4 is a sectional view taken on line IV—IV of Fig. 2.

Figure 5 is a sectional view on an enlarged scale, of an entrainment baffle device desirably employed in the regenerative preheater shown in Fig. 1.

Figure 2:
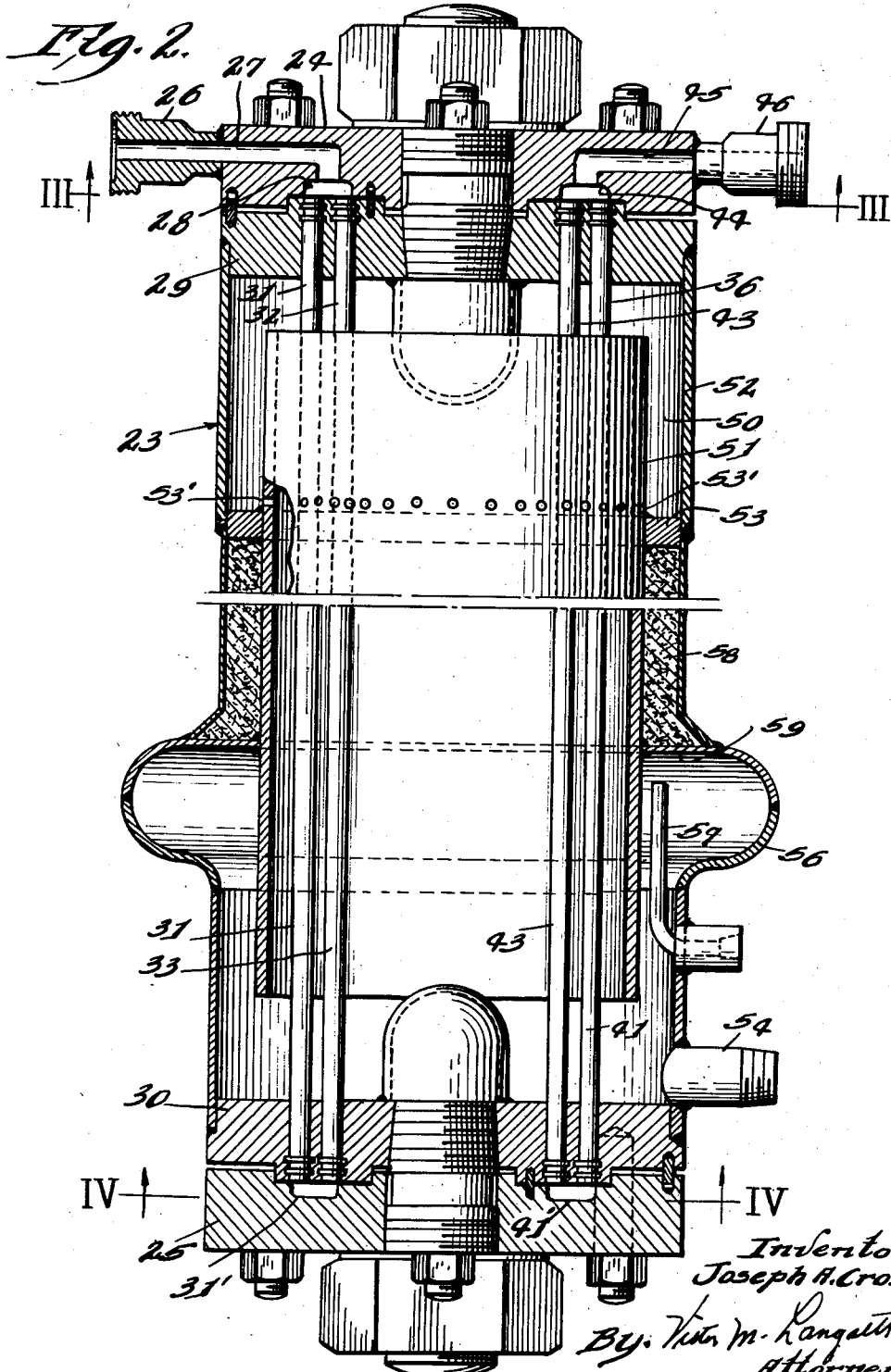
Figure 2 is a vertical sectional view of the superheater shown in Fig. 1, omitting, however, all but four of the heater tubes.

As shown in the drawings the "milk product" is precooled to a temperature range between 32° F. and 50° F., preferably at about 40° F., in a jacketed cooling and storage tank 9 which may be cooled as by flowing a refrigerant through jacket 10, and is continuously fed into the system from a pipe 11, by means of a motor driven centrifugal pump 12, through pipe 13, through float valve 14 under control of float ball 15, pipe 16, thence through spray nozzle 17 into the interior of preheater tank 18.

As the milk product emerges from the nozzle it encounters and mingles with water vapor separated from preceding quantities of superheated milk product, as will be further discussed hereinafter. For the moment it is sufficient to observe that the milk product, by its contact with such vapor, becomes preheated from its entering temperature by an amount, in degrees of temperature about equal to the temperature drop which it later undergoes when being evaporatively cooled, as hereinafter explained.

The sprayed heated product collects in the bottom of the tank 18 from which it is drawn by any suitable positive pressure pump 19, through pipe 20 and delivered under positive pressure into pipe 21. If desired an homogenizer, of suitable design and well known construction, may be interposed at 22 in the line 21.

The milk product, whether homogenized or not, is pumped into the superheater generally designated as 23, wherein the product, flowing in two separate streams therethrough, is heated by indirect heat exchange with some heating medium such as steam to a desired temperature, which should be above 190° F. and preferably is some regulated temperature between 240° F. and 280° F.

In order to attain quickly a high pasteurizing temperature without burning the product on the tubes I prefer a superheater of the character herein shown, having top and bottom header plates 24 and 25.

The pipe 21 is connected to an inlet connection 26 for delivering the product into passage 27 in the top header 24 communicating with the distributor duct 28.

The superheater has an upper tube sheet 29 and a lower tube sheet 30 in which are firmly mounted 36 stainless steel tubes of 18 gauge steel having a 3/8" outside diameter and slightly over 1/4" inside diameter. The entering stream of product is delivered by the distributor 28, half going into tube 31 and half into tube 32. The positions where the ends of these and other tubes register with horizontal ducts such as 28, are indicated in Figs. 3 and 4, to clarify the distribution and flow of the product.

At the top of Fig. 2 the sectional view departs enough from a diametrical transverse section to show the tubes 31 and 32 which in reality are both somewhat lateral of the central sectional plane. Also, at the lower end of Fig. 2 the view shows the lower end of tube 31 and the lower end of tube 33 into which the downward flow from tube 31 is diverted by duct 31' to flow upwardly through tube 33. The upper end of tube 33 registers with one end of duct 33' in header 24, which diverts the upwardly flowing product into the top of tube 35 for downward flow into duct 35' in the bottom header 25, which latter duct delivers the product into an upward flow tube 37.

Without further numbering of the horizontal ducts in headers 24 and 25 and the positions of the tube ends as shown in these headers in Figs. 3 and 4, it will be observed that the outer circle of tubes in the upper half of Fig. 3, such, for example, as 31, 35 and 39, are down flow tubes, while the inner circle of tubes, such as 33 and 37, are up flow tubes. Horizontal ducts, such as 33', 37' connect these tubes at their upper ends. Hence, skipping a few tubes without numbering, tube 41 is a down flow tube which delivers into duct 41' in the bottom header 25 for delivery of that stream of the product into the up flow tube 43.

Referring now to the other stream which started downwardly in tube 32, that stream is directed by horizontal duct 32' into an up flow tube 34 emptying into an upper duct 34'.

Hence the outer circle of tube ends shown in the lower half of Fig. 3 are up flow tubes. Accordingly, tube 36 is an up flow tube, and both it and tube 43 deliver their separate streams into the horizontal duct 44 in the upper header 24 which thereupon unites the two separately heated streams and delivers them through duct 45 into the outlet connection 46.

While these two separate streams are being forced by the pump 19 at high pressure and high velocity through the narrow heating tubes they are subjected to heating by high pressure steam supplied to the heater 23, as follows. An automatically regulated steam pressure valve 47 regulates the flow of steam from a supply line 48, through pipe 49 into an annular space 50 formed between an inner tubular shell 51 and an outer shell 52. A continuous annular web 53 blocks downward flow of the steam which therefore flows up over the top of the open ended shell 51, then downwardly among the tubes. Steam condensate may be drained through ports 53' and together with all of the steam condensate is evacuated through pipe 54 and trap 55 in any suitable manner, while air and other non-condensibles are allowed to rise around the bottom skirt of shell 51 into the enlarged annular bulge 56 and are ejected through a pipe 57 in any suitable manner. Insulation 58 may be disposed between web 53 and web 59.

The number of heating tubes employed as well as the size, length, and passage arrangement, is subject to variation depending on product being treated, the heating range required, and capacity desired. The drawings indicate the positions of two sets of tubes, 18 in each set, each set carrying half of the product entering the heater at 24, and delivering the two streams reunited through outlet 46.

If the pump delivers the product to inlet 24 at about 450 pounds per square inch pressure, a high velocity may be maintained through the entire length of the two sets of tubes, each tube in the example being 4 feet in length. The outlet pressure, where the superheated product flows from the tubes through a restricted orifice 60 will correspond roughly to the vapor pressure resulting from the selected temperature attained by the product as it completes its passage through the heater. Pressure drop due to friction dissipates most of the initial high pressure.

The steam supplied to the superheater will be automatically regulated at such a pressure as to elevate the preheated product from its preheat temperature to the selected superheat temperature, and with the equipment herein described this can be accomplished while the product is being pumped through the tubes in about 3½ seconds. Under these conditions "burning on" of the product upon the tubes is largely or entirely prevented.

The superheated product emerging through the restricted orifice 60 explodes into the chamber 61 which is maintained under a vacuum substantially identical with that in the preheater 18, this vacuum being maintained and regulated so that the unvaporized milk product is evaporatively cooled to a temperature of below 160° F. The liquid product, that is, the final pasteurized product, may be withdrawn through pipe 62 by means of pump 63 and delivered for further cooling or other treatment or use.

The water vapor flashed off during evaporative cooling in closed chamber 61 flows through a large vapor duct 64 past the normally open valve 65, underneath the downwardly curved deflection baffle 66 and thence upwardly for mixing with and condensation by the spray of incoming fresh milk product.

The water vapor released in chamber 61 is recondensed by and into the incoming product, thus preheating the latter, temporarily diluting the preheated product roughly in the amount of about 10% by volume. This dilution is of course, terminated by the flashing off of an equal amount of water vapor subsequently in chamber 61.

By precooling the fresh milk product between 32° F. and 50° F., preferably to about 40° F. the condensing effect of the product spray in preheater 18, aided by properly regulated ejection of air and other non-condensibles from tank 18 makes it easily possible to hold the vacuum low enough to evaporatively cool the final pasteurized milk product to 160° F. and lower, and without significant loss of water vapor from the product. This product, after being pumped under vacuum from chamber 61, is readily cooled by ordinary heat exchange equipment and does not retain or acquire a cooked flavor.

For the elimination of non-condensibles any suitable vacuum producing equipment may be employed, as for example, the ejector herein shown.

By means of the steam jet air ejector assembly including the ejector nozzle 67, and pressure regulator 68, adjusted to eject air and other non-condensible gases from the regenerative preheater 18 and assist in regulating the vacuum in the preheater at a predetermined pressure, a number of desirable results are accomplished. Air is drawn from the incoming spray of fresh milk and ejected from the system. Air contained in the water vapor received from the flash chamber 61 is also ejected. Fresh milk product entering the vacuumized preheater 18 may contain odors, some of which will be released in the tank 18 and others not so released will be flashed off with the steam in chamber 61 and returned to 18. All of these odors will be discharged by the ejector. Any cooked or heated flavor which the product may acquire in the superheater, such as sulphydrils, is flashed off in chamber 61 and ejected by the steam ejector from the preheater 18. It has been noted that while the discharge of the ejector may bear a noticeable cooked flavor aroma the final product delivered by pump 63 will have none.

Since it is important to be sure that the product is superheated to a selected temperature a flow diversion valve 69 is interposed in pipe 70 leading to the flash chamber. A thermostatic element 71 is inserted in this pipe and is connected to a combination temperature indicator and controller 72 of well known design and available on the market which serves, when the product temperature at 71 falls below a fixed temperature, to operate valve 69 to divert the flow from outlet pipe 70 into pipe 73 and deliver it through a restricted orifice 74 back into the preheater. The controller 72 will simultaneously act on the air valve 75 to close valve 65. Thereupon, the diverted product will be pumped back again through the preheater and such recirculation maintained until the desired superheated temperature is attained to cause controller 72 to direct the product into the flash chamber by re-operating valve 69, simultaneously opening valve 65.

As an aid to the reduction in entrainment of aqueous vapor by the ejected air a baffle of the type shown in Figure 5 may well be employed. This baffle, extending the full diameter of the upper part of the preheating chamber, has a web 76 with openings at intervals much as at 77 and 78 with downwardly bent flanges such as 79 and 80 adjacent these openings, a bottom wall 81 having a central opening 82 for the upward flow of gases, drip ports such as 83 for baffled condensed vapor, and an upper wall 84 with a central opening 85 through which the non-condensibles may flow to the steam actuated ejector.

The amount of temperature gain of the fresh product in the preheater will be about equal to the temperature drop of the superheated product in the flash chamber. It is desirable that whole milk be evaporatively cooled to below 160° F. By precooling the fresh milk to 40° F. and superheating it to about 240° F. it is easy to maintain such a vacuum in the preheater that the superheated product will be evaporatively cooled to about 140° F. and the vapor released during such cooling will preheat the incoming solution about up to 140° F.

If the fresh milk be precooled to 40° F. and after preheating be superheated to 280° F. it may be flash cooled to about 160° F. under the vacuum existing in the flash and preheater chamber. If the precooled temperature of the fresh milk be 50° F. it should not be superheated above 270° F. in order to flash cool to about 160° F.

The steam jet air ejector should be regulated to draw out only the non-condensibles and as little as possible of the uncondensed water vapor, since the process does not aim to concentrate the aqueous milk products solutions but rather to pasteurize them. A slight amount of water vapor in practice will probably mingle and escape with the air but experimentation has indicated that this amount can be held to about 0.1% or less of the water content of these products, and this is a negligible and unobjectionable amount.

As the ejector ejects all the non-condensibles, the vacuum maintained in the flash and preheater chambers may be determined and controlled by the condensing action of the precooled milk products solutions being treated. The vacuum, or degree of sub-atmospheric pressure, being maintained may therefore be governed entirely by coordinating the temperature to which the product is precooled and the temperature to which it is later superheated and so coordinating them that the product is evaporatively cooled to such a temperature that it will not acquire a cooked flavor at which temperature before it can be further cooled, if necessary, after leaving the flash chamber 61. About 160° F. is considered a safe and proper maximum temperature to which whole milk should be evaporatively cooled although this temperature might be exceeded by a few degrees if it be promptly lowered outside the flash chamber before the milk can acquire a cooked flavor.

There may be instances, however, when the combined effect of the precooled temperature and the superheated temperature would produce a vacuum and therefore a temperature to which the superheated product is evaporatively cooled, which latter temperature may be lower than is desired for the discharge temperature of the pasteurized product. For example, if the user of the invention desires to homogenize the product after pasteurizing he might prefer to deliver it from the pasteurizer at 140° F. or higher. If the combined effect of the precooled and superheated temperatures would normally cause the product to evaporatively cool the product to 130° F., for example, this apparatus may be adjusted to regulate the pressure in the flash chamber so that the product will flash cool to say 140° F. or 145° F.

This adjustment is accomplished by slightly opening valve 86 (Fig. 1) by means of handle 87 to allow a small amount of air to bleed into the suction line 88 leading to the ejector nozzle 67. Thereupon, a small back pressure of unexhausted air can accumulate in the preheater, raising the subatmospheric pressure, and consequently raising the temperature to which the product is evaporatively cooled. A suitable pressure gauge 89 located as shown or elsewhere may be employed for indicating this regulated pressure.

The present invention differs in a number of significant matters from my prior Patent 2,498,836 issued February 28, 1950 and my co-pending application Serial No. 749,543 filed May 21, 1947, now Patent 2,548,776, issued April 10, 1951, each of which discloses regenerative heating of liquid comestibles for other purposes.

The apparatus shown herein is a practical and at present preferred embodiment of the equipment required for the practice of this invention. Nevertheless, some variations and departures from the disclosure may be adopted and some changes may be made in the methods employed without departing from the spirit and scope of the invention herein disclosed and claimed.

Having shown and described my invention, I claim:

1. A continuous process for pasteurizing an aqueous milk product solution comprising spraying the solution at a temperature below 50° F. downwardly into a vacuumized chamber while heating the solution by condensing thereinto all of the water vapor flashed from preceding quantities of the same solution superheated, pumping the thus preheated solution at high pressure and velocity in indirect heat exchange relation with a heating medium to superheat it above 190° F., evaporatively cooling the superheated solution by discharging it into a second vacuumized chamber communicating with the first chamber, separately discharging the evaporatively cooled product, discharging the vapor released during said cooling into said first chamber for mixture as aforesaid with said spray and direct condensing of the vapor to impose vacuum on the vapor in said second vacuumized chamber, ejecting under vacuum from the first chamber air and other non-condensible gases and odors, and establishing the temperature to which the product is evaporatively cooled by coordinating the precooled temperature and the superheated temperature to maintain a vacuum at which the product may evaporate at about 160° F. or lower.

2. A continuous process for pasteurizing an aqueous milk products solution comprising precooling the solution to a temperature between 32° F. and 50° F., introducing the cooled solution in widely dispersed form into a vacuumized preheating chamber and intermingling it therein with all of the water vapor released during evaporative cooling of preceding quantities of the solution, pumping the preheated solution from said chamber and superheating the same to above 190° F. while flowing at high velocity and high pressure, thereafter evaporatively cooling the heated solution by expansion into a chamber separate from but communicating with said first chamber and withdrawing the unvaporized solution from the second chamber, utilizing the vapor released in the second chamber for mingling with and preheating the incoming solution in the first chamber while condensing thereby substantially all of the vapor, separately ejecting under vacuum from the first chamber air, odors and other non-condensible gases derived from the incoming solution and released vapor, regulating said ejecting action to withdraw only non-condensibles, and coordinating the superheating of the solution and the temperature of the incoming solution to maintain a pressure in the second chamber low enough to effect evaporative cooling therein of the preheated solution to at least 160° F.

3. A continuous process for pasteurizing an aqueous milk product solution comprising precooling the solution to at least about 50° F., spraying the precooled solution into a vacuumized chamber and simultaneously heating the solution by commingling the spray with all of the water vapor obtained from evaporative cooling of preceding quantities of solution treated as herein set forth, pumping the thus heated solution at high pressure and velocity and heating the same by indirect heat exchange to above 190° F., thereafter evaporatively cooling the superheated solution by discharging it into a vapor expansion chamber communicating with said first chamber, continuously withdrawing the evaporatively cooled solution from the expansion chamber, delivering to the first chamber the vapors evolved from said evaporative cooling, withdrawing under vacuum the non-condensible gases as they accumulate in the first chamber, and regulating the evaporation temperature of the solution in said expansion chamber at an upper limit of about 160° F. by controlling the temperature of the incoming solution.

4. A continuous process for pasteurizing an aqueous milk product solution comprising precooling the solution to at least about 50° F., spraying the precooled solution into a vacuumized chamber and simultaneously heating the solution by commingling the spray with all of the water vapor obtained from evaporative cooling of preceding quantities of solution treated as herein set forth, pumping the thus heated solution at high pressure and velocity and heating the same by indirect heat exchange to above 190° F., thereafter evaporatively cooling the superheated solution by discharging it into a vapor expansion chamber communicating with said first chamber, continuously withdrawing the evaporatively cooled solution from the expansion chamber, delivering to the first chamber the vapors evolved from said evaporative cooling, withdrawing under vacuum the non-condensible gases, and regulating the evaporation temperature of the solution in said expansion chamber by jointly controlling the temperature of the incoming solution and maintaining a pocket of non-condensible gases in the top of the preheating chamber to partially counteract the condensing action in that chamber.

5. A continuous process for pasteurizing an aqueous milk product solution comprising precooling the solution to at least about 50° F., spraying the precooled solution into a vacuumized chamber and simultaneously heating the solution by commingling the spray with all of the water vapor obtained from evaporative cooling of preceding quantities of solution treated as herein set forth, pumping the thus heated solution at high pressure and velocity and heating the same by indirect heat exchange in about 3½ seconds to above 190° F., thereafter evaporatively cooling the superheated solution by discharging it into a vapor expansion chamber communicating with said first chamber, continuously withdrawing the evaporatively cooled solution from the expansion chamber, delivering to the first chamber the vapors evolved from said evaporative cooling, withdrawing under vacuum the non-condensible gases as they accumulate in the first chamber, and regulating the evaporation temperature of the solution in said expansion chamber at an upper limit of about 160° F. by controlling the temperature of the incoming solution.

6. Apparatus for pasteurizing a milk product solution comprising a preheating chamber, means for spraying precooled solution downwardly in said chamber, a superheating chamber having relatively narrow heat exchange tubes and means for pumping thereinto at high velocity and high pressure solution withdrawn from said preheating chamber, a vapor expansion chamber and means including a restricted orifice therein for delivering superheated solution into the expansion chamber, means for superheating the solution flowing through said tubes, means for withdrawing under vacuum from the expansion chamber the unvaporized solution, means for delivering into the preheating chamber for upward flow therethrough the vapor released in said expansion chamber, and means for withdrawing under vacuum from the upper part of the preheating chamber the non-condensible gases accumulating therein.

7. Apparatus as described in claim 6 wherein the superheating chamber includes a plurality of tubes of small diameter arranged to receive and direct the flow of the solution in more than one stream to a common outlet.

JOSEPH A. CROSS.

References Cited in the file of this patent

UNITED STATES PATENTS

| Number | Name | Date |
|---|---|---|
| 2,140,011 | Hass | Dec. 13, 1938 |

OTHER REFERENCES

Hunziker, O. F.: "Condensed Milk & Milk Powder," 4th edition, published by the author, La Grange, Illinois, 1926, pages 123, 124, 156 to 164.